(12) United States Patent
Wang

(10) Patent No.: US 8,783,450 B2
(45) Date of Patent: Jul. 22, 2014

(54) SHELL FOR ELECTRICAL DEVICE

(71) Applicants: Fu Tai Hua Industry (Shenzhen) Co., Ltd., Shenzhen (CN); Hon Hai Precision Industry Co., Ltd., New Taipei (TW)

(72) Inventor: Hua-Yong Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/866,042

(22) Filed: Apr. 19, 2013

(65) Prior Publication Data

US 2013/0277237 A1    Oct. 24, 2013

(30) Foreign Application Priority Data

Apr. 20, 2012  (CN) .......................... 2012 1 0116945

(51) Int. Cl.
*A45C 11/00*    (2006.01)

(52) U.S. Cl.
USPC ........................ 206/45.2; 206/45.24; 206/320

(58) Field of Classification Search
USPC ........... 206/45.2, 45.23, 45.24, 576, 320, 701
See application file for complete search history.

(56) References Cited

U.S. PATENT DOCUMENTS

| | | | |
|---|---|---|---|
| 8,201,687 B2 * | 6/2012 | Zeliff et al. ................... | 206/320 |
| 2008/0237432 A1 * | 10/2008 | Patterson ...................... | 248/458 |
| 2012/0012483 A1 * | 1/2012 | Fan ............................... | 206/320 |
| 2012/0261288 A1 * | 10/2012 | Lach et al. .................... | 206/320 |
| 2013/0056374 A1 * | 3/2013 | Chung .......................... | 206/320 |
| 2013/0134061 A1 * | 5/2013 | Wu et al. ...................... | 206/320 |

* cited by examiner

*Primary Examiner* — Jacob K Ackun
(74) *Attorney, Agent, or Firm* — Novak Druce Connolly Bove + Quigg LLP

(57) ABSTRACT

An exemplary shell for holding an electrical device on an external supporter. The shell includes a plate, a sidewall, and a rest. The sidewall extends from the plate. The plate and the sidewall cooperatively define a receiving space for holding the electrical device. The rest is attached to the plate. The rest includes two connecting ends being rotatable relative to the plate and a supporting end between the connecting ends and configured for standing on the external supporter and cooperating with the sidewall to hold the electrical device on the external supporter. A length of the rest is adjustable, so that a distance between the supporting end and the sidewall is correspondingly adjustable.

20 Claims, 12 Drawing Sheets

SHELL FOR ELECTRICAL DEVICE

BACKGROUND

1. Technical Field

The present disclosure generally relates to shells for electrical devices, and especially to a shell capable of holding an electrical device on an external supporter and changing an orientation of the electrical device relative to the external supporter.

2. Description of Related Art

Handheld electrical devices are widely used. Some handheld devices, such as certain mobile phones, are not only used for calling and messaging, but also for playing movies and videos. However, it may not be very convenient for a user to hold the handheld device in their hand while watching a movie.

Therefore, a means to overcome the above-described shortcoming is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
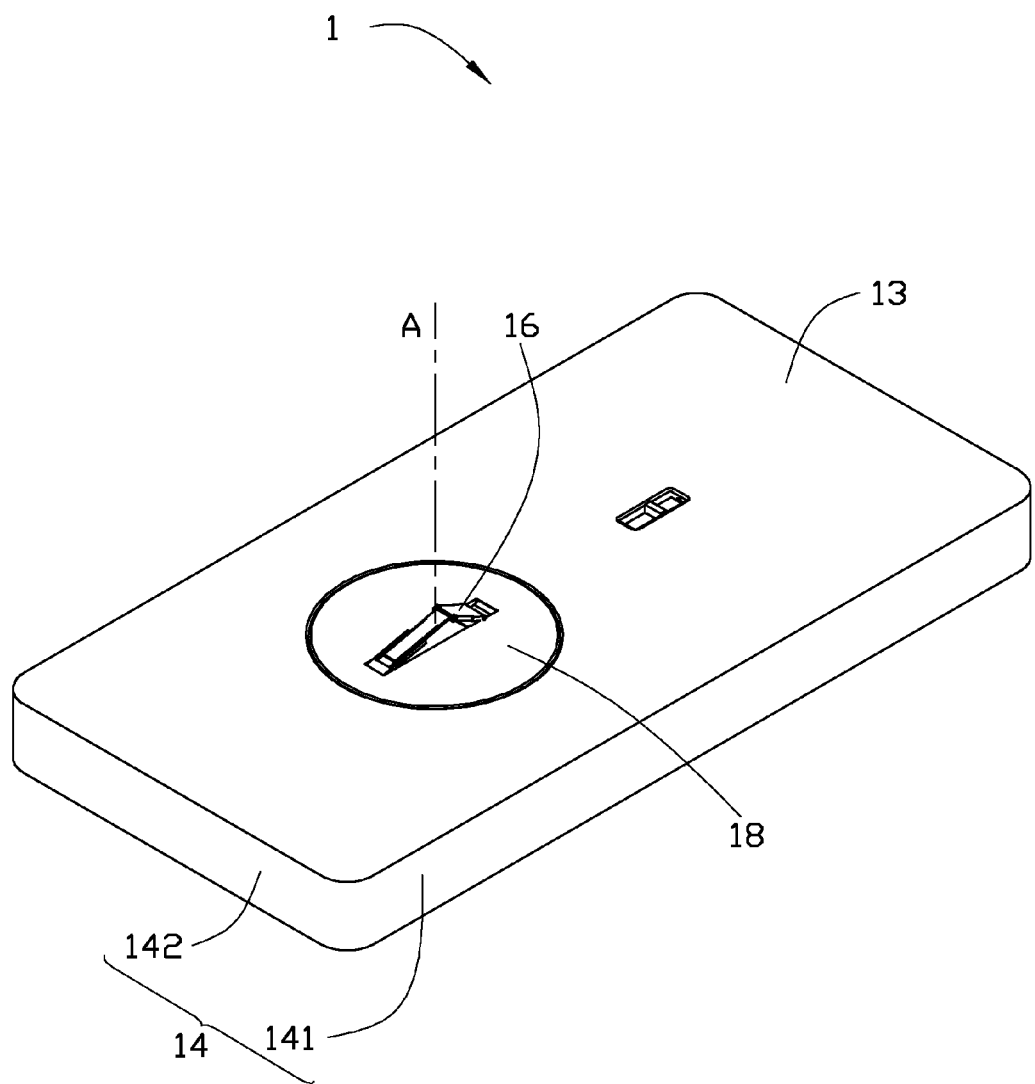
FIG. 1 is an isometric view of a shell in accordance with an embodiment of the present disclosure.
Figure 2:
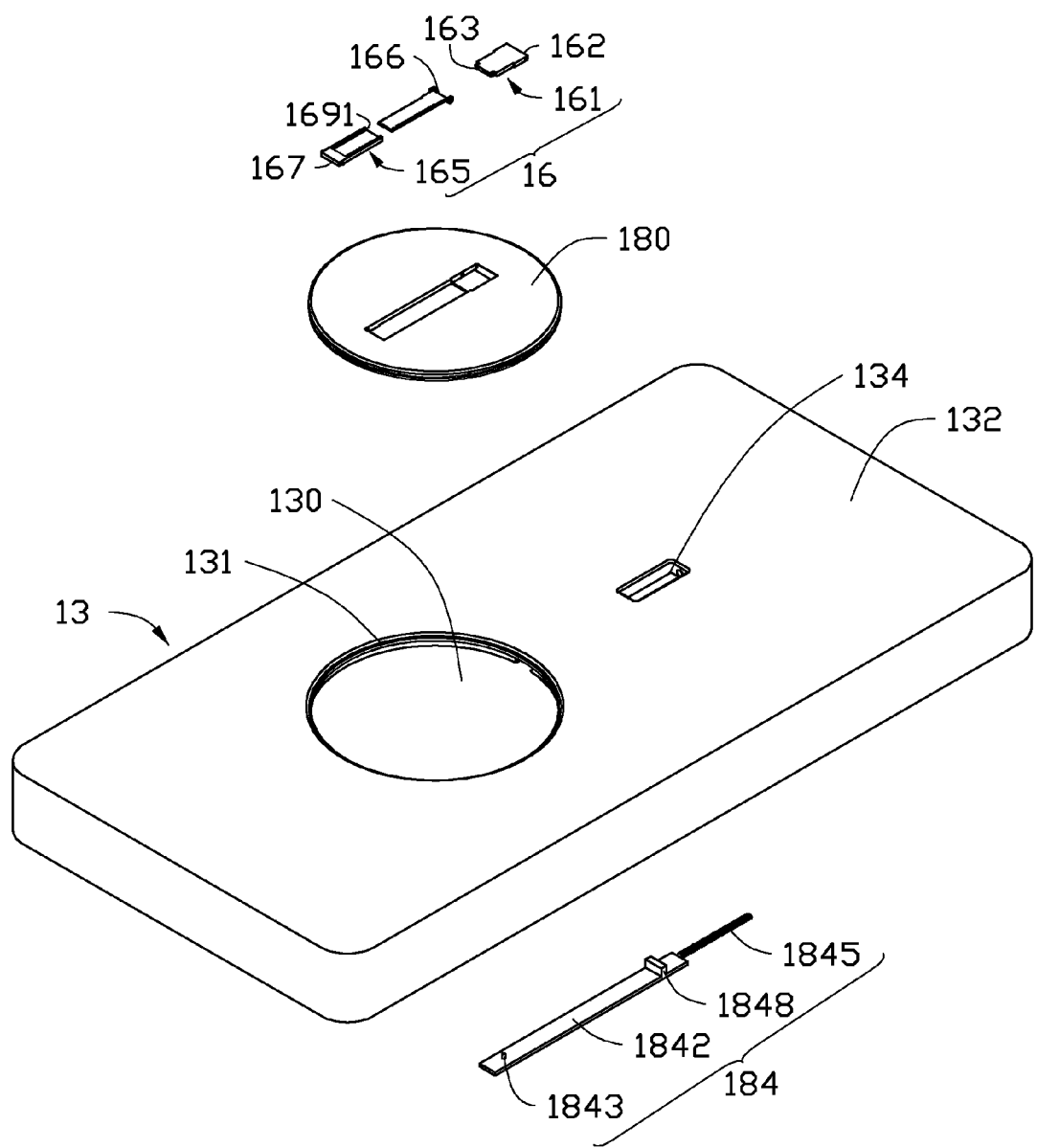
FIG. 2 is an exploded view of the shell of FIG. 1.
Figure 3:
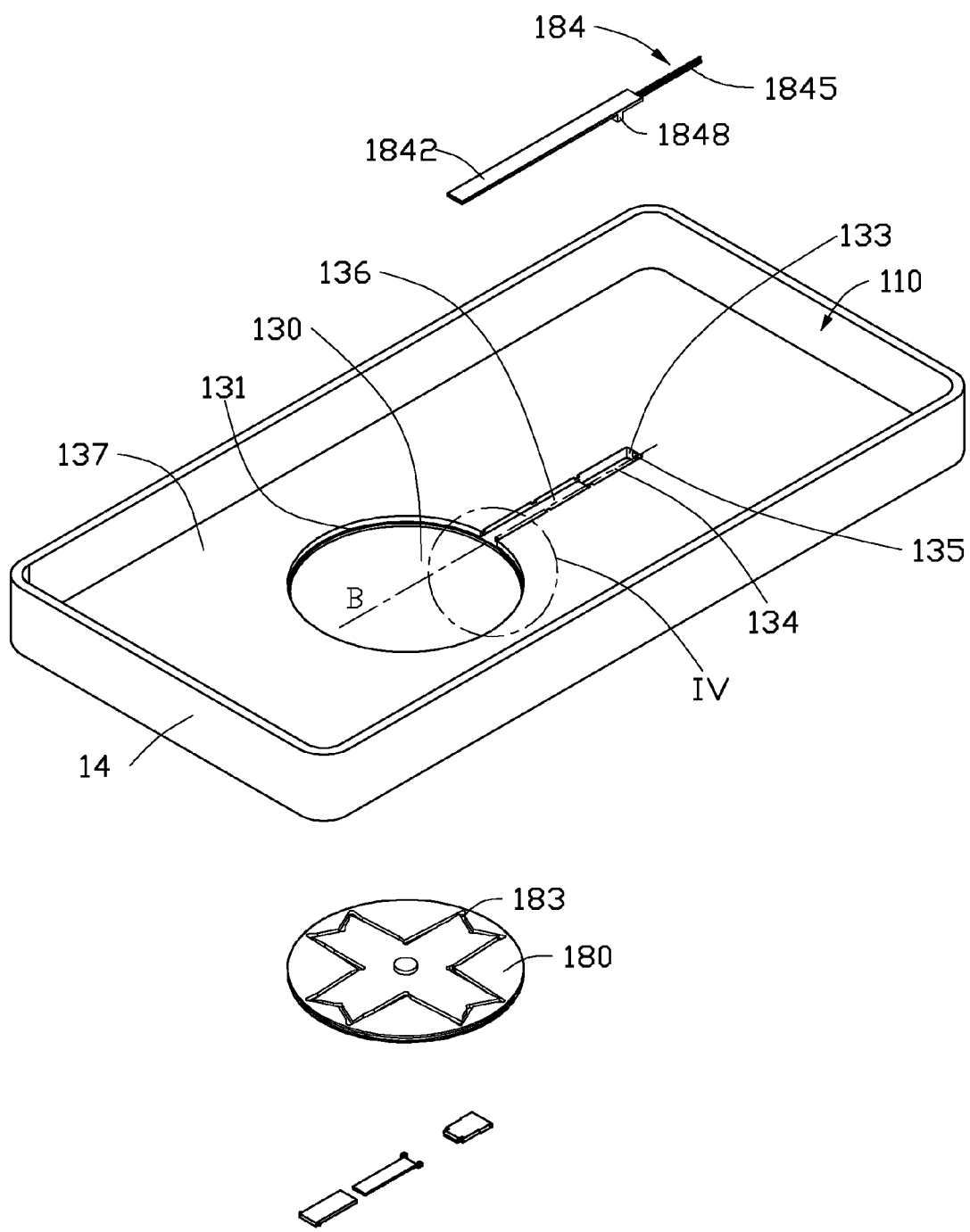
FIG. 3 is an isometric view of the shell of FIG. 2 viewed from another angle.

FIGS. 1, 2, and 3 illustrate a shell 1 in accordance with an exemplary embodiment. The shell 1 is capable of holding an electrical device (not shown) on an external supporter and changing an orientation of the electrical device relative to the external supporter. In this embodiment, the electrical device may be a handheld electrical device, such as a cellular phone or an e-book. The shell 1 includes a plate 13, a plurality of sidewalls 14 located at edges of the plate 13, a rest 16, and a rotation mechanism 18. A receiving space 110 is defined by the plate 13 in cooperation with the sidewalls 14 to accommodate the electrical device. The rotation mechanism 18 is mounted on the plate 13. A circular main body 180 of the rotation mechanism 18 can be rotated in the plate 13. The rest 16 is located on the rotation mechanism 18.

The sidewalls 14 include a first sidewall 141 and a second sidewall 142. In this embodiment, the plate 13 is essentially rectangular. The first sidewall 141 and the second sidewall 142 are located at two adjacent sides of the plate 13 and are vertical to the plate 13.

Figure 4:
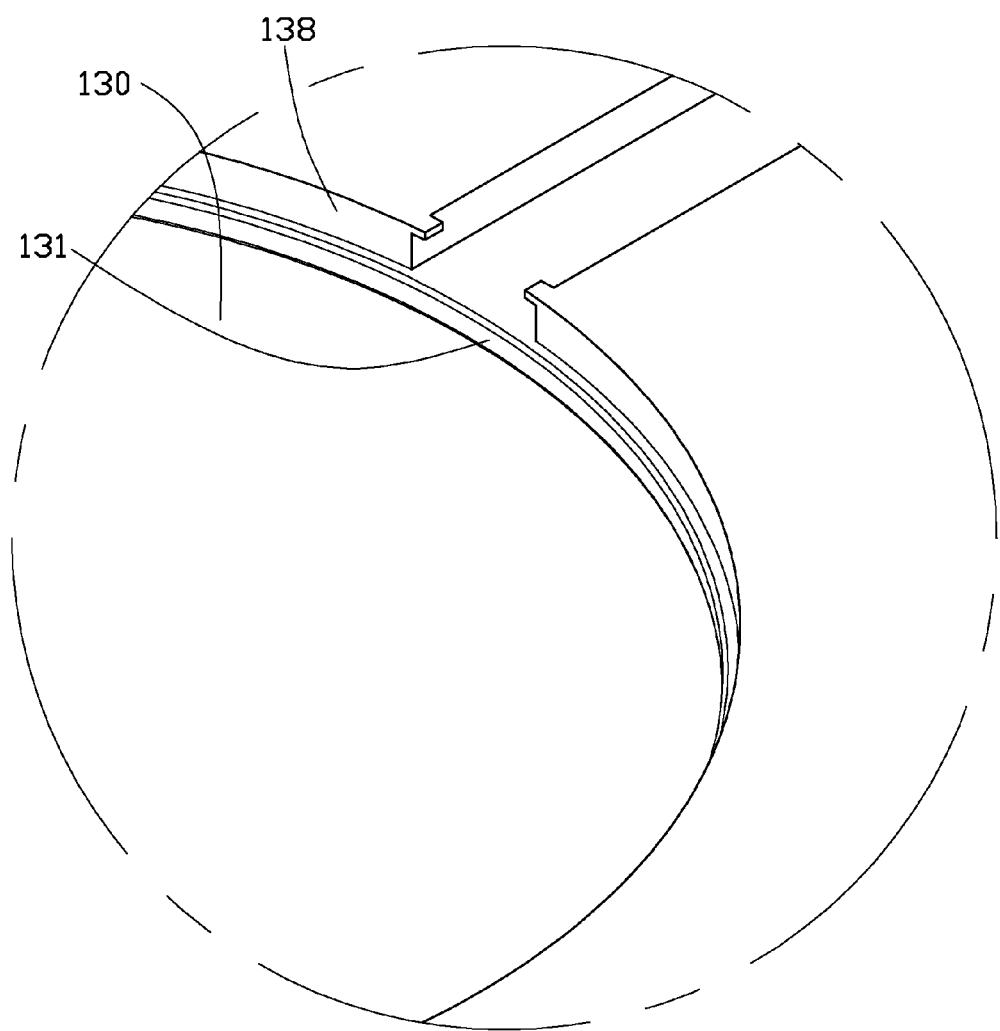
FIG. 4 is an enlarged view of a circled portion IV of FIG. 3.

The plate 13 includes a first surface 132 and a second surface 137 at opposite sides thereof. The first surface 132 faces away from the receiving space 110. The plate 13 defines a circular through hole 130 passing through the first surface 132 and the second surface 137, and a guiding slit 134 passing through the first surface 132 and the second surface 137. The plate 13 also defines a holding groove 136 in the second surface 137. The holding groove 136 interconnects the through hole 130 and the guiding slit 134. Referring also to FIG. 4, the through hole 130 is bounded by a substantially annular inner side surface 138. An annular rail 131 extends inwards from the inner side surface 138. A baffle wall 133 bounds an end of the guiding slit 134 far from the through hole 130. The baffle wall 133 faces the holding groove 136. A receiving groove 135 is defined in the baffle wall 133. A line B collinear with a longitudinal axis of the receiving groove 135 passes through a center of the through hole 130. The longitudinal axis of the receiving groove 135 and a longitudinal axis of the holding groove 136 are collinear.

Figure 5:
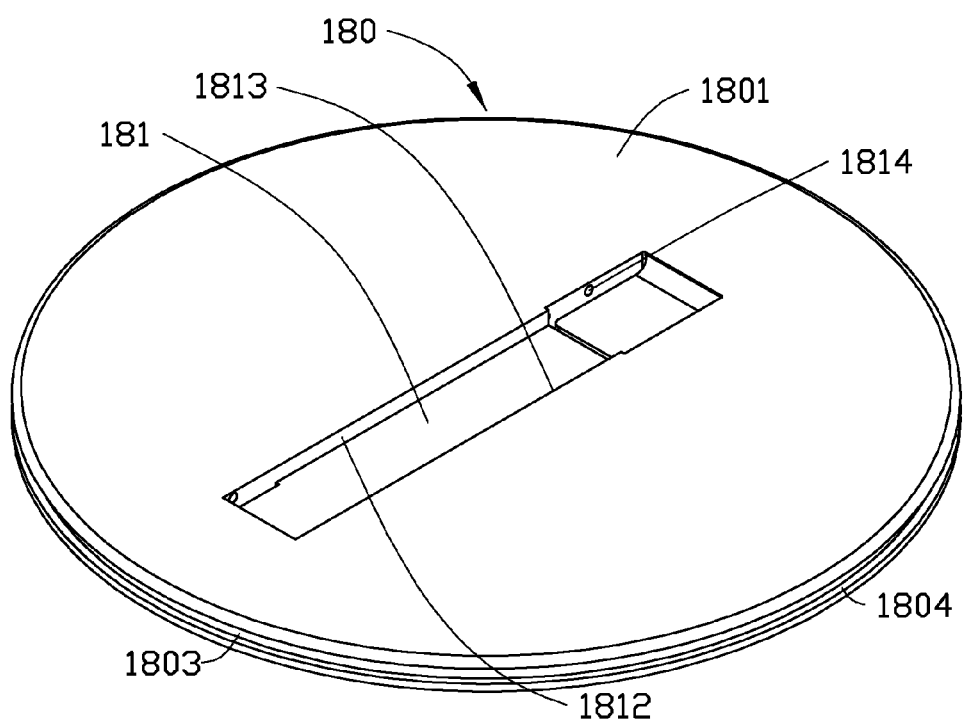
FIG. 5 is an enlarged view of a main body of a rotation mechanism of the shell of FIG. 2.
Figure 6:
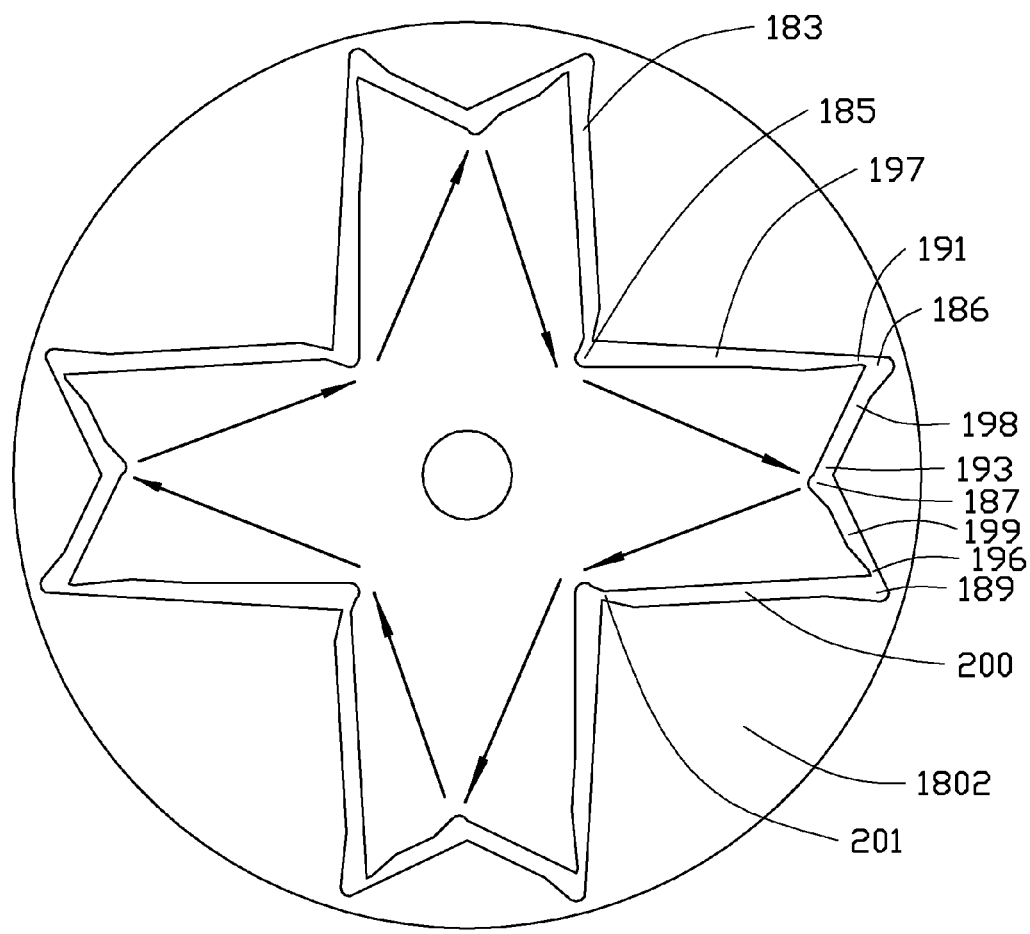
FIG. 6 is a plan view of the main body of FIG. 5, showing a side of the main body hidden in FIG. 5.

Referring also to FIGS. 2, 5, and 6, the rotation mechanism 18 includes the main body 180 and a transmission rod 184. The main body 180 includes an exposed surface 1801 and an inner surface 1802 at opposite sides thereof, and an annular side surface 1803 interconnecting the exposed surface 1801 and the inner surface 1802. The exposed surface 1801 faces away from the receiving space 110. An elongate recess 181 is defined in the exposed surface 1801. A rotating track 183 is formed in the inner surface 1802, and an annular groove 1804 is defined in the side surface 1803.

The transmission rod 184 includes a rod body 1842, a controlling projection 1848, an adjusting projection 1843, and an elastic member 1845. The rod body 1842 is substantially an elongated bar. The controlling projection 1848 and the adjusting projection 1843 extend from a same surface of the rod body 1842, and are respectively located close to opposite ends of the rod body 1842. In this embodiment, the elastic member 1845 is a spring.

Referring to FIG. 5, the recess 181 is defined diametrically across the main body 180. The recess 181 is bounded at opposite long sides by a first recess sidewall 1812 and an opposite, parallel second recess sidewall 1813. The first recess sidewall 1812 and the second recess sidewall 1813 are located inside the main body 180, and connect to the exposed surface 1801 of the main body 180. Two pivot holes 1814 are defined in each of the first recess sidewall 1812 and the second recess sidewall 1813. The two pivot holes 1814 of the first recess sidewall 1812 are located close to opposite ends of the recess 181, and the two pivot holes 1814 of the second recess sidewall 1813 are located close to the opposite ends of the recess 181. The pivot holes 1814 of the first and second recess sidewalls 1812, 1813 are opposite each other.

Referring to FIG. 6, the rotating track 183 is endless, and includes a number of sub-tracks connected end to end. In this embodiment, there are four identical sub-tracks, and each of the sub-tracks is approximately in the shape of the letter "M". The sub-tracks are symmetrical about a center of the inner surface 1802. Each sub-track includes a first path 197, a second path 198, a third path 199, and a fourth path 200 arranged end to end in that order. Each of the first path 197, the second path 198, the third path 199, and the fourth path 200 includes a head end and a tail end, defined according to a direction of movement of the adjusting projection 1843 along the rotating track 183 (see also below). In particular, relative to the main body 180, the adjusting projection 1843 moves from the head end to the tail end of each of the paths 197, 198, 199, 200.

A transverse width of each of the first path 197, the second path 198, the third path 199, and the fourth path 200 becomes gradually narrower from the head end to the tail end. The head end of the first path 197 defines a fixing position 185. In this embodiment, when the fixing position 185 is rotated around the center of the main body 180 to stop on a line (hereinafter, "reference line") defined by the axis of the holding groove 136 extending through the center of the main body 180, the main body 180 stably remains in this position and must be impelled by an applied external force to rotate in the through hole 130 further. A position of least width of the first path 197 defines a critical position 191 at the tail end of the first path 197. The head end of the second path 198 defines an adjusting position 186.

When the main body 180 is rotated in the through hole 130, the critical position 191 passes the reference line first, and then the adjusting position 186 passes the reference line. Since the width of the tail end of the first path 197 is narrower than the width of the head end of the second path 198 and the rotating track 183 is configured to slidably receive the adjusting projection 1843, the adjusting projection 1843 is only able to move with difficulty from the adjusting position 186 to the critical position 191. Furthermore, a position of least width of the second path 198 defines a critical position 193 at the tail end of the second path 198. The head end of the third path 199 defines a fixing position 187. A position of least width of the third path 199 defines a critical position 196 at the tail end of the third path 199. The head end of the fourth path 200 defines an adjusting position 189. A position of least width of the fourth path 200 defines a critical position 201 at the tail end of the fourth path 200. The function of the fixing position 187 is essentially the same as the function of the fixing position 185. When the fixing position 187 is rotated around the center of the main body 180 to stop on the reference line, the main body 180 stably remains in this position and must be impelled by an applied external force to rotate in the through hole 130 further. Thus, in use of the rotation mechanism 18, the main body 180 rotates in the through hole 130 in a single direction only (see also below).

Figure 7:
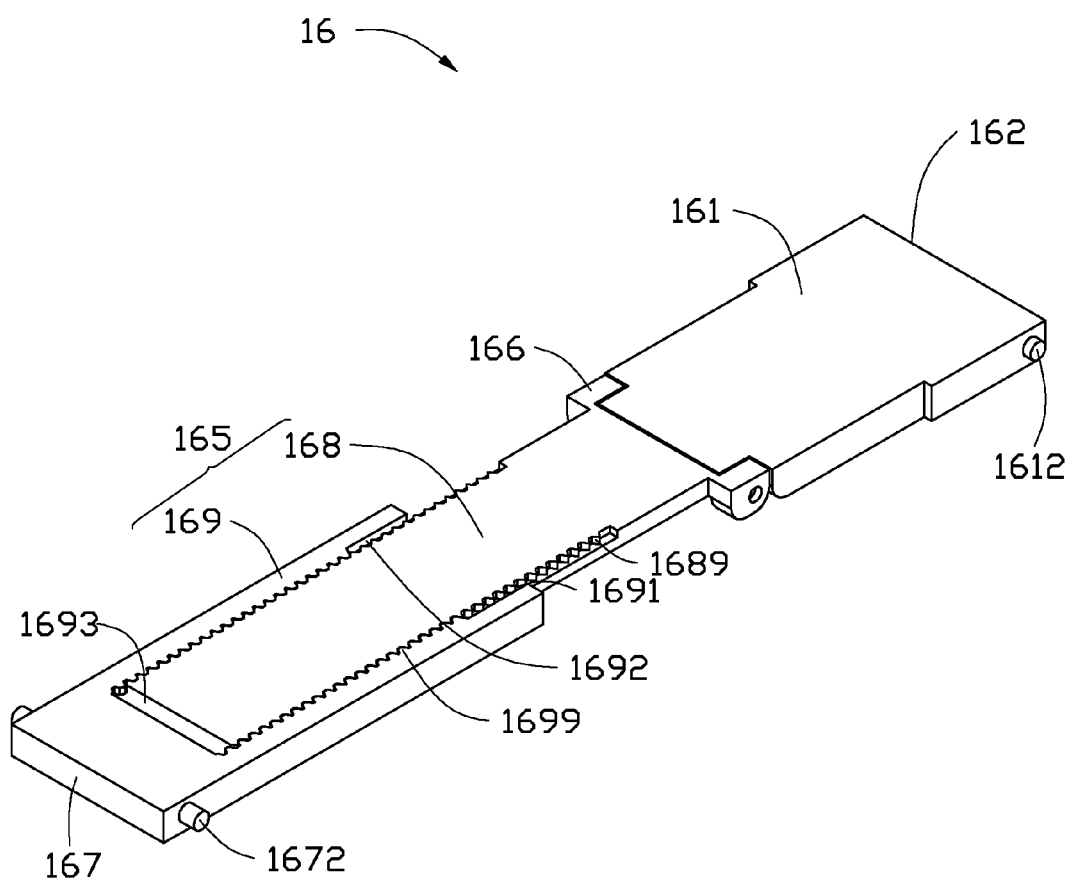
FIG. 7 is an enlarged view of a rest of the shell of FIG. 1, but showing another state of the rest.
Figure 8:
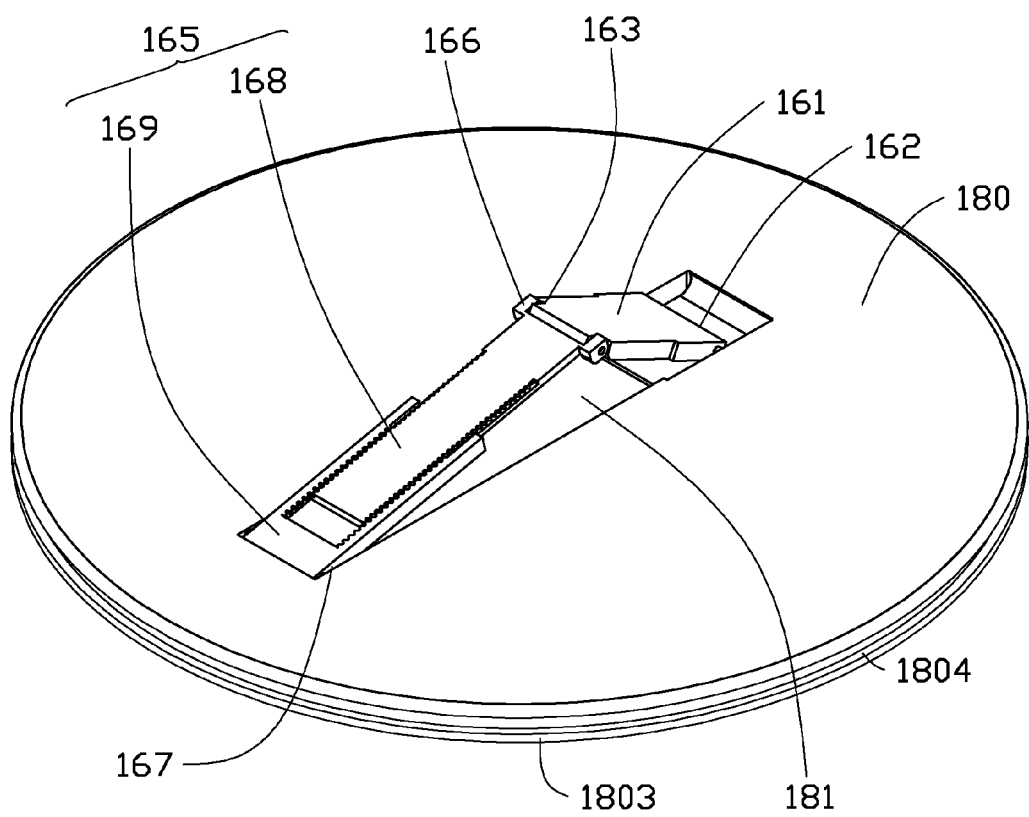
FIG. 8 is an enlarged view of the main body and the rest of the shell of FIG. 1.
Figure 9:
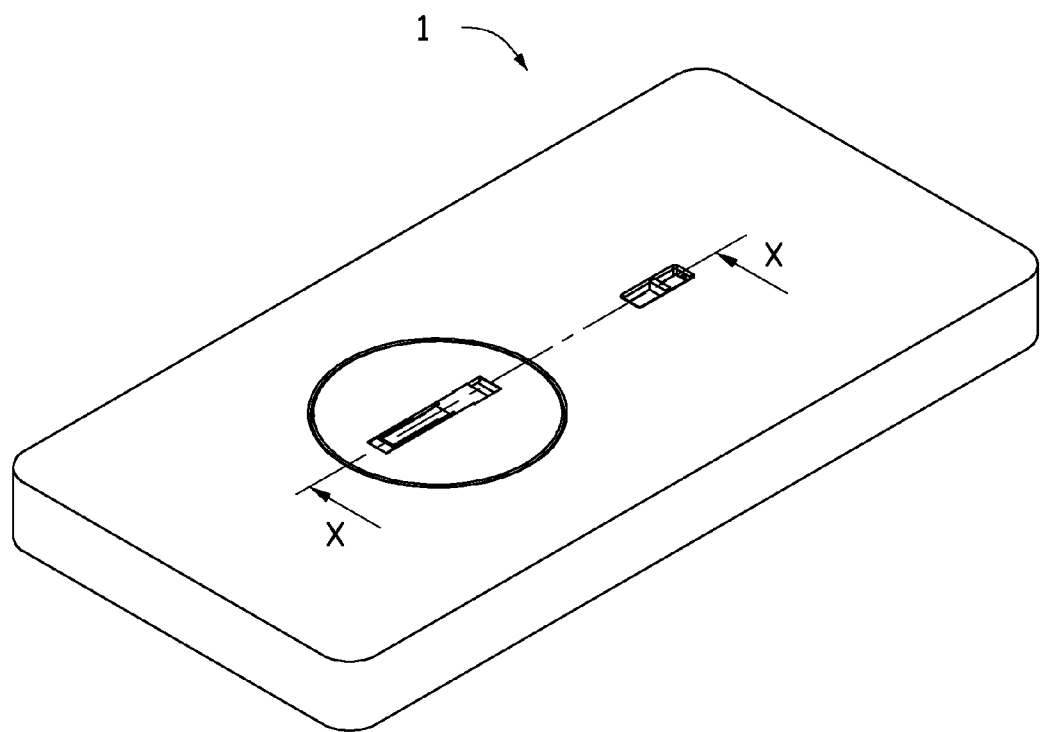
FIG. 9 is similar to FIG. 1, but showing the rest stowed in the main body.
Figure 10:
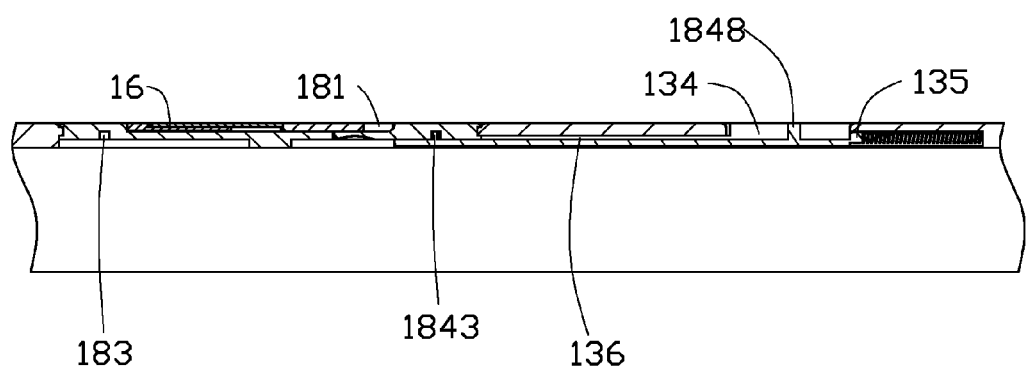
FIG. 10 is a cross-sectional view taken along line X-X of FIG. 9.
Figure 11:
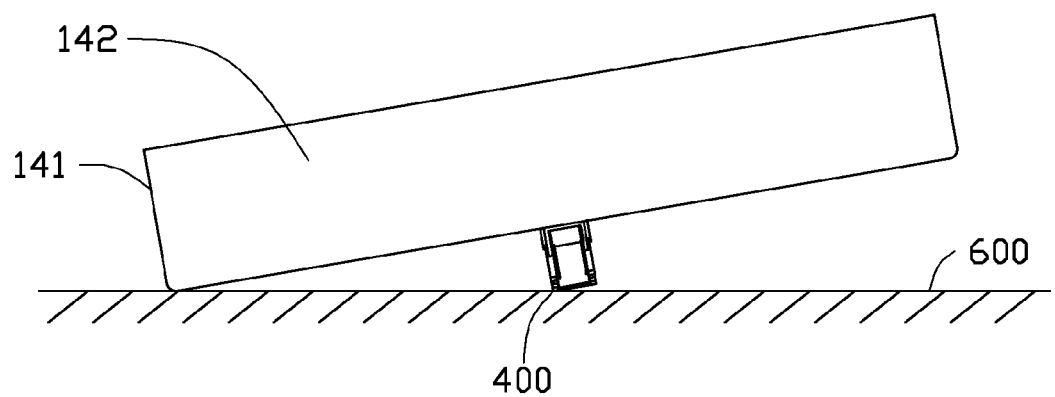
FIG. 11 is a side view of the shell of FIG. 1 supported on an external supporter by a first sidewall of the shell and one particular support point of the rest.
Figure 12:
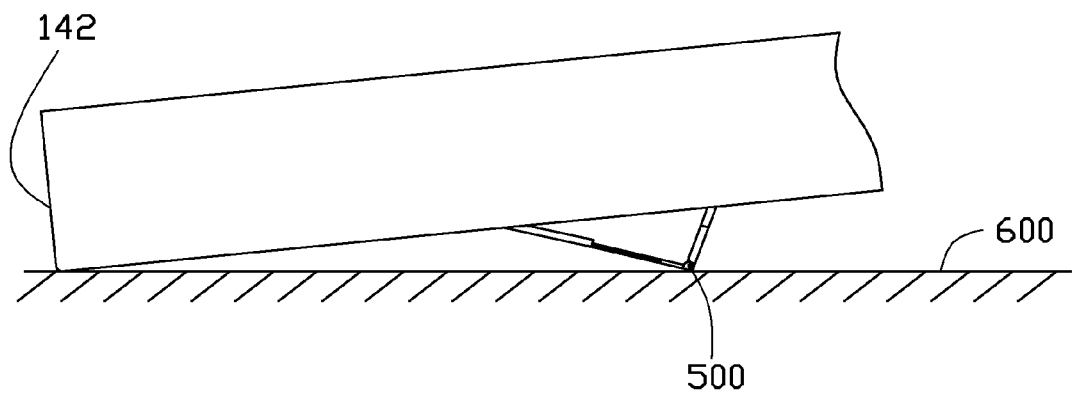
FIG. 12 is a side view of a part of the shell of FIG. 1 supported on the external supporter of FIG. 11 by a second sidewall of the shell and another different support point of the rest.

Referring also to FIGS. 2, 7, and 8, the rest 16 includes a first supporting arm 161 and a second supporting arm 165. The first supporting arm 161 includes a first connecting end 162 and an opposite second connecting end 163. The second supporting arm 165 includes a third connecting end 166 and an opposite fourth connecting end 167. The third connecting end 166 rotatably connects to the second connecting end 163. The third connecting end 166 serves as a supporting end (not labeled) to support the combined shell 1 and electrical device on an external supporter 600 (see FIGS. 11 and 12) in cooperation with the plate 13 and the sidewalls 14. The length of the second supporting arm 165 is variable by pulling or pushing the second supporting arm 165 or the first supporting arm 161 with one's fingertips (see below). The first connecting end 162 includes two first pivot pins 1612 at opposite lateral sides thereof, respectively. The fourth connecting end 167 includes two second pivot pins 1672 at opposite lateral sides thereof, respectively.

The second supporting arm 165 includes a sliding board 168 and a connecting board 169. The connecting board 169 includes two opposite side beams 1692. The side beams 1692 define a sliding groove 1693 therebetween, and an opening 1691 at an end of the sliding groove 1693 away from the fourth connecting end 167. In assembly of the second supporting arm 165, the sliding board 168 enters the sliding groove 1693 via the opening 1691, and is slidable along the two opposite side beams 1692. In this embodiment, inside surfaces of the two side beams 1692 and opposite lateral surfaces of the sliding board 168 facing the two side beams 1692 are all toothed. Teeth 1689 of the sliding board 168 mesh with teeth 1699 of the two side beams 1692. When external force is applied, the sliding board 168 can slide longitudinally along the sliding groove 1693, with the teeth 1689, 1699 riding over each other, to change the length of the second supporting arm 165.

In assembly of the shell 1, the rail 131 is slidably engaged in the annular groove 1804 to rotatably fix the main body 180 in the through hole 130 of the plate 13. The main body 180 can thus be rotated in the through hole 130. The main body 180 and the through hole 130 are concentric. The exposed surface 1801 of the main body 180 is located away from the receiving space 110. The inner surface 1802 of the main body 180 is located at the receiving space 110. The rest 16 is located on the main body 180 and rotates in unison with the main body 180. The two first pivot pins 1612 of the first connecting end 162 are rotatably mounted in the corresponding pivot holes 1814 of the first recess sidewall 1812 and the second recess sidewall 1813. The two second pivot pins 1672 of the fourth connecting end 167 are rotatably mounted in the corresponding pivot holes 1814 of the first recess sidewall 1812 and second recess sidewall 1813. The adjusting projection 1843 is movably accommodated in the rotating track 183. The rod body 1842 is slidably accommodated in the holding groove 136. The controlling projection 1848 is slidably accommodated in the guiding slit 134. The one end of the elastic member 1845 is connected to the end of the rod body 1842 where the controlling projection 1848 is located. An opposite end of the elastic member 1845 is fixed to an inmost end of the receiving groove 135.

In another embodiment, the rotation mechanism 18 can be configured such that it does not provide any adjusting function. That is, the main body 180 is configured only to hold the rest 16. In such case, the main body 180 and the plate 13 are integrally formed as a single monolithic body, the transmission rod 184 is omitted, and the plate 13 is otherwise suitably configured having regard to the above-described altered configurations.

Referring also to FIGS. 1 and 9-12, when the rest 16 is in a stowed position, the rest 16 is lain down flat and completely received in the recess 181. In this position, the second supporting arm 165 is at its shortest possible length. The shell 1 can be placed on the external supporter 600 (such as a tabletop or desktop), with the plate 13 located face down on the external supporter 600. When the first supporting arm 161 and the second supporting arm 165 are simultaneously rotated relative to the plate 13, the supporting end of the rest 16 protrudes out of the recess 181, and the rest 16 is thus switched from the stowed position to a supporting position. When the length of the second supporting arm 165 changes, the distance between a support point 400 (see FIG. 11) of the supporting end and the first sidewall 141 changes accordingly, and the distance between a support point 500 (see FIG. 12) of the supporting end and the second sidewall 142 changes accordingly. Thereby, a tilt angle between the plate 13 and the external supporter 600 changes, so that the combined shell 1 and electrical device can be held on the external supporter 600 at any desired tilt angle among a plurality of different tilt angles.

Referring also to FIGS. 1, 6, 9, and 10, an external force applied by a user can drive the controlling projection 1848 to move along the guiding slit 134 towards the baffle wall 133. Thus, in a typical example, the adjusting projection 1843 moves from the fixing position 185 to the adjusting position 186. Since the rod body 1842 only moves along the longitudinal axis of the holding groove 136 away from the center point of the main body 180, the main body 180 is driven to rotate counterclockwise around its center (as viewed in FIG. 6). Simultaneously, the elastic member 1845 is compressed. Then when the external force applied on the controlling projection 1848 is lessened sufficiently or removed, the elastic member 1845 decompresses and drives the rod body 1842 to move back towards the center point of the main body 180. Thereby, the main body 180 is driven to further rotate a smaller amount counterclockwise until the adjusting projection 1843 reaches the fixing position 187. In the present embodiment, when the adjusting projection 1843 moves from the fixing position 185 to the fixing position 187, this corresponds to the main body 180 being driven 45° counterclockwise. One of the arrows in FIG. 6 represents the net progression of the adjusting projection 1843 from the fixing position 185 to the fixing position 187 in the manner described above. All the arrows in FIG. 6 represent the net progression of the adjusting projection 1843 from a given fixing position to a corresponding next fixing position, again and again, substantially according to the manner described above.

In the above-described process, since the width of the first path 197 at the critical position 191 is narrower than that of the second path 198 at the adjusting position 186, the adjusting projection 1843 effectively cannot move from the adjusting position 186 back to the fixing position 185. In other words, the adjusting projection 1843 is allowed to travel along the rotating track 183 in only a single direction, such that the direction of rotation of the main body 180 is counterclockwise only. When the adjusting projection 1843 is at either of the fixing positions 185, 187, the elastic member 1845 biases the rod body 1842, but the adjusting projection 1843 is unable to move any further away from the elastic member 1845. Thus the main body 180 is stably located in position in the through hole 130. As long as the support point 500, 600 of the supporting end is not located on a line A (see FIG. 1) coinciding with a center axis of the main body 180, the rotation of the main body 180 changes the distance between the supporting end and each of the two sidewalls 141, 142, to thereby change the tilt angle between the plate 13 and the external supporter 600.

In summary, the tilt angle of the plate 13 relative to the external supporter 600 can be changed via two methods. One method is to simply change the length of the second supporting arm 165. The other method is to put the rest 16 in a supporting position, and then drive the controlling projection 1848 to rotate the main body 180 to change the position of the supporting end of the rest 16. Of course, in the latter method, any desired supporting position can be selected by also changing the length of the second supporting arm 165. Thus the shell 1 provides a plurality of the tilt angles for the electrical device. The user can select whatever tilt angle he or she wants.

It is to be understood that even though numerous characteristics and advantages of the present embodiments have been set forth in the foregoing description, together with details of the structures and functions of the embodiments, the disclosure is illustrative only; and changes may be in detail, especially in the matters of shape, size and arrangement of parts within the principles of the embodiments to the full extent indicated by the broad general meaning of the terms in which the appended claims are expressed.

What is claimed is:

1. A shell for holding an electrical device on an external supporter, the shell comprising:
    a plate;
    a sidewall extending from the plate, the plate and the sidewall cooperatively defining a receiving space for holding the electrical device; and
    a rest attached to the plate, the rest comprising:
        two opposite connecting ends, each being rotatable relative to the plate; and
        a supporting end between the connecting ends and configured for standing on the external supporter and cooperating with the sidewall to hold the electrical device on the external supporter,
    wherein a length of the rest is adjustable, such that a distance between the supporting end and the sidewall is correspondingly adjustable.

2. The shell of claim 1, wherein the rest comprises a first supporting arm and a second supporting arm, the first supporting arm comprises a first end and an opposite second end, the first end is rotatable relative to the plate and serves as one of the connecting ends, the second supporting arm comprises a third end and an opposite fourth end, the third end is rotatable relative to the second end of the first supporting arm and cooperates with the second end to serve as the supporting end, the fourth end of the second supporting arm is rotatable relative to the plate and serves as another one of the connecting ends, and a length of the second supporting arm is adjustable.

3. The shell of claim 2, wherein the second supporting arm further comprises a sliding board and a connecting board movably connected with the sliding board, and the sliding board is slidable relative to the connecting board to adjust the length of the second supporting arm.

4. The shell of claim 3, wherein the connecting board comprises two parallel opposite side beams, the side beams define a sliding groove therebetween and an opening at an end of the sliding groove, the opening is located far from the fourth end, and the sliding board is slidable in the sliding groove along the side beams.

5. The shell of claim 4, wherein at least one lateral surface of the sliding board is toothed, an inner lateral surface of at least one of the side beams is toothed, and at least some of the teeth of the sliding board are meshed with at least some of the teeth of the side beam.

6. The shell of claim 2, wherein the shell comprises a rotation body rotatable in a plane of the plate, the rotation body comprises an exposed surface and an inner surface at opposite sides thereof, the exposed surface faces away from the receiving space, and the connecting ends are rotatably connected to the rotation body at the exposed surface.

7. The shell of claim 6, wherein the plate comprises a first surface and a second surface at opposite sides thereof, the first surface faces away from the receiving space, the plate defines a circular through hole passing through the first surface and the second surface, and the rotation body is rotatably accommodated in the through hole.

8. The shell of claim 7, wherein the supporting end has a support point, the supporting end is configured for standing on the external supporter at the support point, the rest is adjustable such that the supporting end is not located on a line coinciding with a center axis of the rotation body, and a distance between the support point and the sidewall is adjustable by rotation of the rotation body.

9. The shell of claim 8, wherein a rotating track is formed in the inner surface of the rotation body, the shell further comprises a transmission rod movably engaged with the rotating track and configured for being actuated by a user such that the transmission rod drives the rotation body to rotate.

10. The shell of claim 9, wherein the plate defines a guiding slit passing through the first surface and the second surface and a holding groove in the second surface, the holding groove interconnects the through hole and the guiding slit, a longitudinal axis of the receiving groove passes through a center of the through hole, the rotation body and the through hole are concentric, the longitudinal axis of the receiving groove and a longitudinal axis of the holding groove are collinear, the transmission rod comprises a rod body, a controlling projection, an adjusting projection, and an elastic member, the controlling projection and the adjusting projection extend from a same surface of the rod body, the elastic member biases the rod body towards the center of the rotation body, the adjusting projection is movably accommodated in the rotating track, the controlling projection is slidably accommodated in the guiding slit, and the rod body is slidably accommodated in the holding groove.

11. The shell of claim 10, wherein a baffle wall bounds an end of the guiding slit far from the through hole, a receiving groove is defined in the baffle wall, a line collinear with a longitudinal axis of the receiving groove passes through the center of the through hole, an end of the elastic member is connected to one end of the rod body where the controlling projection is located, and an opposite end of the elastic member is fixed to an inmost end of the receiving groove.

12. The shell of claim 10, wherein the rotating track is endless, and comprises a number of substantially identical sub-tracks connected end to end, each of sub-tracks is approximately in the shape of the letter "M", the sub-tracks are symmetrical about a center of the rotation body, each sub-track comprises a first path, a second path, a third path, and a fourth path arranged end to end in that order, each of the first path, the second path, the third path, and the fourth path comprises a head end and a tail end, a transverse width of each of the first path, the second path, the third path, and the fourth path becomes gradually narrower from the head end to the tail end, and the head end of a succeeding one of the second path, the third path, and the fourth path is adjacent to the tail end of the corresponding preceding one of the first path, the second path, the third path, respectively.

13. The shell of claim 12, wherein a recess is defined diametrically across the rotation body at the exposed surface, the recess is bounded at opposite long sides by a first recess sidewall and an opposite, parallel second recess sidewall, the first recess sidewall and the second recess sidewall are located inside the rotation body and connect to the exposed surface of rotation body, the connecting ends are rotatably connected to the first recess sidewall and the second recess sidewall by pivot pins, the rest is completely accommodated in the recess when the rest is in a stowed position, and in the stowed position the rest has a shortest possible length.

14. A shell for holding an electrical device on an external supporter, the shell comprising:
a plate;
a sidewall extending from the plate, the plate and the sidewall cooperatively defining a receiving space for holding the electrical device;
a plate-shaped rotation body being substantially aligned with and rotatably connected to the plate; and comprising an exposed surface and an inner surface at opposite sides thereof, the exposed surface facing away from the receiving space; and
an adjustable rest located on the rotation body at the exposed surface of the rotation body, the rest comprising:
two opposite connecting ends each rotatably connected to the rotation body; and
a supporting end between the connecting ends and having a support point, the supporting end configured for standing on the external supporter at the support point and cooperating with the sidewall to hold the electrical device on the external supporter, the rest adjustable such that the supporting end is not located on a line coinciding with a center axis of the rotation body, wherein the rotation body is rotatable relative to the plate to adjust a distance between the support point of the supporting end and the sidewall.

15. The shell of claim 14, wherein the plate comprises a first surface and a second surface at opposite sides thereof, the first surface faces away from the receiving space, the plate defines a circular through hole passing through the first surface and the second surface, the rotation body is rotatably accommodated in the through hole.

16. The shell of claim 15, wherein a rotating track is formed in the inner surface of the rotation body, the shell further comprises a transmission rod movably engaged with the rotating track and configured for being actuated by a user such that the transmission rod drives the rotation body to rotate.

17. The shell of claim 16, wherein the plate defines a guiding slit passing through the first surface and the second surface and a holding groove in the second surface, the holding groove interconnects the through hole and the guiding slit, a longitudinal axis of the receiving groove passes through a center of the through hole, the rotation body and the through hole are concentric, the longitudinal axis of the receiving groove and a longitudinal axis of the holding groove are collinear, the transmission rod comprises a rod body a controlling projection, an adjusting projection, and an elastic member, the controlling projection and the adjusting projection extend from a same surface of the rod body, the elastic member biases the rod body to the center of the rotation body, the adjusting projection is movably accommodated in the rotating track, the controlling projection is slidably accommodated in the guiding slit, and the rod body is slidably accommodated in the holding groove.

18. The shell of claim 17, wherein a baffle wall bounds an end of the guiding slit far from the through hole, a receiving groove is defined in the baffle wall, a line collinear with a longitudinal axis of the receiving groove passes through a center of the through hole, an end of the elastic member is connected to one end of the rod body where the controlling projection is located, and an opposite end of the elastic member is fixed to an inmost end of the receiving groove.

19. The shell of claim 17, wherein the rotating track is endless, and comprises a number of substantially identical sub-tracks connected end to end, each of sub-tracks is approximately in the shape of the letter "M", the sub-tracks are symmetrical about a center of the rotation body, each sub-track comprises a first path, a second path, a third path, and a fourth path arranged end to end in that order, each of the first path, the second path, the third path, and the fourth path comprises a head end and a tail end, a transverse width of each of the first path, the second path, the third path, and the fourth path becomes gradually narrower from the head end to the tail end, and the head end of a succeeding one of the second path, the third path, and the fourth path is adjacent to the tail end of the corresponding preceding one of the first path, the second path, the third path, respectively.

20. The shell of claim 19, wherein a recess is defined diametrically across the rotation body at the exposed surface, the recess is bounded at opposite long sides by a first recess sidewall and an opposite, parallel second recess sidewall, the first recess sidewall and the second recess sidewall are located inside the rotation body and connect to the exposed surface of the rotation body the connecting ends are rotatably connected to the first recess sidewall and the second recess sidewall by pivot pins, the rest is completely accommodated in the recess when the rest is in a stowed position, and in the stowed position the rest has shortest possible length.

* * * * *